US007412827B2

(12) United States Patent
Verkuilen

(10) Patent No.: US 7,412,827 B2
(45) Date of Patent: Aug. 19, 2008

(54) MULTI-PUMP CONTROL SYSTEM AND METHOD

(75) Inventor: Michael T. Verkuilen, Metamora, IL (US)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 170 days.

(21) Appl. No.: 11/239,228

(22) Filed: Sep. 30, 2005

(65) Prior Publication Data

US 2007/0074511 A1 Apr. 5, 2007

(51) Int. Cl.
*F16D 31/02* (2006.01)

(52) U.S. Cl. .............................. 60/465; 60/428; 60/486

(58) Field of Classification Search ................... 60/389, 60/390, 428, 433, 465, 486
See application file for complete search history.

(56) References Cited

U.S. PATENT DOCUMENTS

| | | | | |
|---|---|---|---|---|
| 3,208,221 | A | | 9/1965 | Schuetz |
| 4,030,623 | A | | 6/1977 | Bridwell et al. |
| 4,078,681 | A | | 3/1978 | Field, Jr. |
| 4,210,061 | A | | 7/1980 | Bianchetta |
| 4,345,436 | A | | 8/1982 | Johnson |
| 4,528,892 | A | | 7/1985 | Okabe et al. |
| 4,586,330 | A | * | 5/1986 | Watanabe et al. ............. 60/428 |
| 5,029,067 | A | | 7/1991 | Nishida et al. |
| 6,050,090 | A | | 4/2000 | Tohji |

FOREIGN PATENT DOCUMENTS

| | | |
|---|---|---|
| DE | 103 15 496 | 10/2004 |
| EP | 0071228 | 2/1983 |
| EP | 1512798 | 3/2005 |

* cited by examiner

*Primary Examiner*—Michael Leslie
(74) *Attorney, Agent, or Firm*—Finnegan, Henderson, Farabow, Garrett & Dunner

(57) ABSTRACT

A hydraulic control system for a work machine is disclosed. The hydraulic control system has a first pump, a second pump, an operator control device, and a controller. The first and second pumps are configured to pressurize a fluid. The operator control device is movable through a range of motion from a neutral position to a maximum position to generate a corresponding control signal. The controller is in communication with the first pump, the second pump, and the operator control device. The controller is configured to receive the control signal, affect operation of the first pump in response to the control signal as the operator control device is moved throughout the range of motion, and affect operation of the second pump in response to the control signal only as the operator control device is moved through a portion of the range of motion.

29 Claims, 3 Drawing Sheets

MULTI-PUMP CONTROL SYSTEM AND METHOD

TECHNICAL FIELD

The present disclosure relates generally to a hydraulic system having multiple pumps, and more particularly, to a method of controlling the multi-pump system.

BACKGROUND

Work machines such as, for example, excavators, loaders, dozers, motor graders, and other types of heavy machinery use multiple actuators supplied with hydraulic fluid from a pump on the work machine to accomplish a variety of tasks. These actuators are typically velocity controlled based on an actuation position of an operator interface device. For example, an operator interface device such as a joystick, a pedal, or any other suitable operator interface device may be movable to generate a signal indicative of a desired velocity of an associated hydraulic actuator. When an operator moves the interface device, the operator expects the hydraulic actuator to move at an associated predetermined velocity. However, when multiple actuators are simultaneously operated, the hydraulic fluid flow from a single pump may be insufficient to move all of the actuators at their desired velocities. Situations also exist where the single pump is undersized and the desired velocity of a single actuator requires a fluid flow rate that exceeds the flow capacity of the single pump.

One method of selectively combining the hydraulic fluid flow from multiple pumps to move a single actuator is described in U.S. Pat. No. 4,345,436 (the ’436 patent) issued to Johnson on Aug. 24, 1982. The ’436 patent describes a hydraulic system having a first circuit supplied with fluid pressurized by a first pump, and a second circuit supplied with fluid pressurized by a second pump. Each of the first and second circuits have multiple fluid motors connected in series by way of bypass passages. In addition, one fluid motor of the first circuit is connected in series with the fluid motors of the second circuit, and one fluid motor of the second circuit is connected in series with the fluid motors of the first circuit. In this manner, if excess fluid exists within the first circuit, it is made available to the one fluid motor of the second circuit. Likewise, if excess fluid exists in the second circuit, it is made available to the one fluid motor of the first circuit. A group of resolver valves connects the highest pressure of the first circuit to the control of the first pump, and the highest pressure of the second circuit to the control of the second pump to thereby control the displacements and associated outputs of the first and second pumps. At times when fluid from one circuit is being delivered to the one motor of the other circuit, the pressure comparing function of the resolver group of the one circuit is extended to include the one motor of the other circuit.

Although the resolver group of the ’436 patent may help control the output of the first and second pumps, even during flow sharing between the first and second circuits, it may be expensive, unreliable, and inefficient. In particular, the numerous resolver valves may increase the cost of the hydraulic system and reduce the reliability. In addition, because the first and second pumps are controlled in response to a pressure or flow fluctuation, rather than in anticipation of the fluctuation, the system may inherently include a time lag. This time lag could decrease the responsiveness and efficiency of the system. Further, it is possible for the resolver valves to induce sudden and extreme control changes in the first and second pumps that could lug down or overspeed an engine drivingly coupled to the first and second pumps. These engine speed deviations could reduce the overall efficiency of a work machine incorporating the hydraulic system of the ’436 patent.

The disclosed control system is directed to overcoming one or more of the problems set forth above.

SUMMARY OF THE INVENTION

In one aspect, the present disclosure is directed to a hydraulic control system. The hydraulic control system includes a first pump, a second pump, an operator control device, and a controller in communication with the first and second pumps and the operator control device. The first and second pumps are configured to pressurize a fluid. The operator control device is movable through a range of motion from a neutral position to a maximum position to generate a corresponding control signal. The controller is configured to receive the control signal, affect operation of the first pump in response to the control signal as the operator control device is moved throughout the range of motion, and affect operation of the second pump in response to the control signal only as the operator control device is moved through a portion of the range of motion.

In another aspect, the present disclosure is directed to a hydraulic control system. The hydraulic control system includes a first pump, a second pump, a fluid actuator, and a controller in communication with the first and second pumps. The first and second pumps are configured to pressurize a fluid. The fluid actuator is movable by the pressurized fluid. The controller is configured to determine a desired characteristic for the fluid actuator, initiate operation of the first pump as the desired characteristic exceeds a minimum value, and initiate operation of the second pump only as the desired characteristic exceeds the minimum value by a predetermined amount.

In yet another aspect, the present disclosure is directed to a method of operating a hydraulic system. The method includes receiving a control signal indicative of the position of an operator control device within a range of motion from a neutral position to a maximum position. The method also includes affecting operation of the first pump in response to the control signal when the control signal indicates an operator control device position being away from the neutral position, and affecting operation of the second pump in response to the control signal only when the control signal indicates an operator control device position being a predetermined amount away from the neutral position.

In yet another aspect, the present disclosure is directed to a method of operating a hydraulic control system. The method includes determining a desired characteristic for a fluid actuator. The method also includes initiating operation of a first pump as the desired characteristic exceeds a minimum value, and initiating operation of a second pump only as the desired characteristic exceeds the minimum value by a predetermined amount.

DETAILED DESCRIPTION

Figure 1:
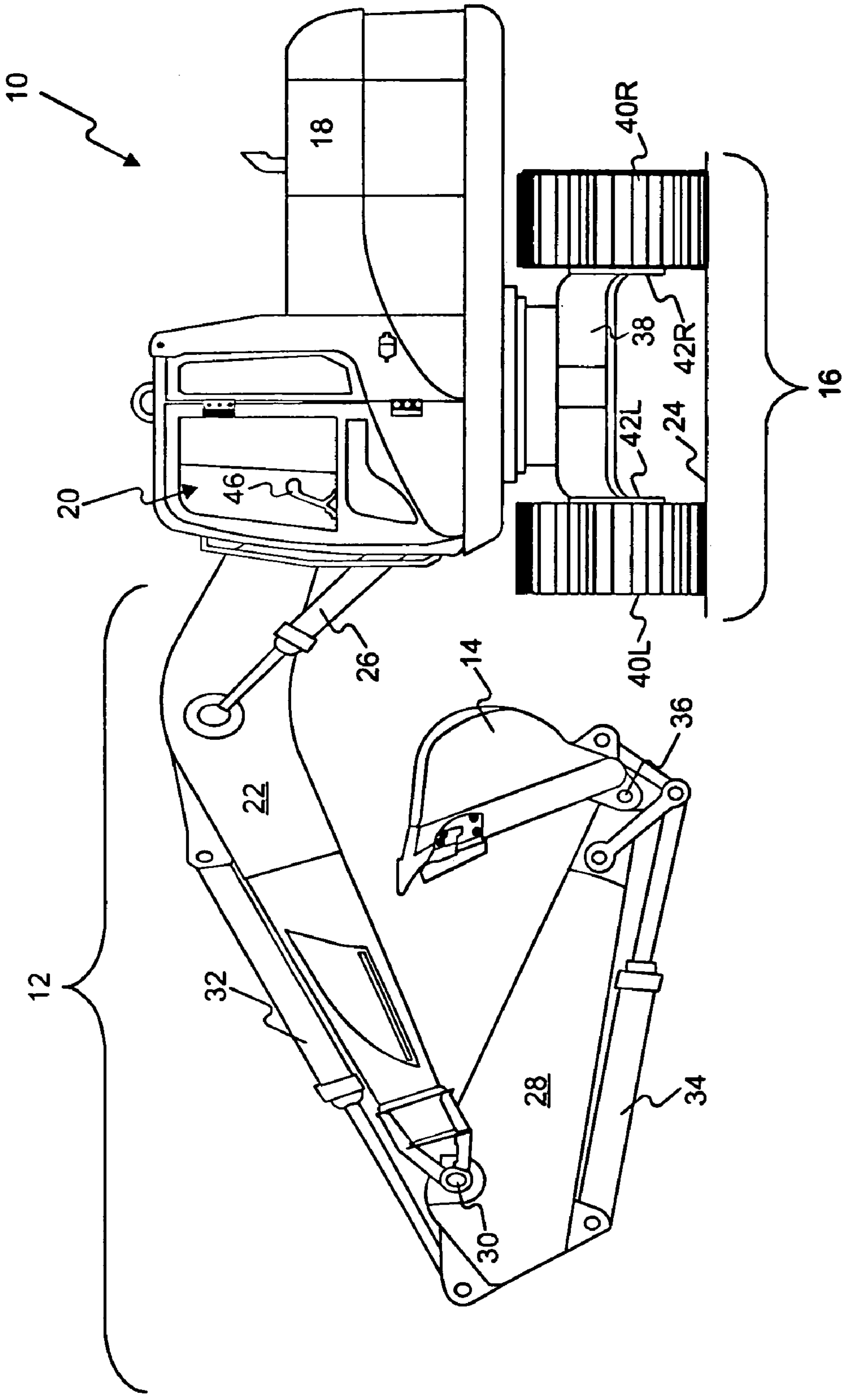
FIG. 1 is a side-view diagrammatic illustration of an exemplary disclosed work machine.

FIG. 1 illustrates an exemplary work machine 10 having multiple systems and components that cooperate to accomplish a task. Work machine 10 may embody a fixed or mobile machine that performs some type of operation associated with an industry such as mining, construction, farming, transportation, or any other industry known in the art. For example, work machine 10 may be an earth moving machine such as an excavator, a dozer, a loader, a backhoe, a motor grader, a dump truck, or any other earth moving machine. Work machine 10 may include an implement system 12 configured to move a work tool 14, a drive system 16 for propelling work machine 10, a power source 18 that provides power to implement system 12 and drive system 16, and an operator station 20 for operator control of implement and drive systems 12, 16.

Implement system 12 may include a linkage structure acted on by fluid actuators to move work tool 14. Specifically, implement system 12 may include a boom member 22 vertically pivotal about an axis (not shown) relative to a work surface 24 by a pair of adjacent, double-acting, hydraulic cylinders 26 (only one shown in FIG. 1). Implement system 12 may also include a stick member 28 vertically pivotal about an axis 30 by a single, double-acting, hydraulic cylinder 32. Implement system 12 may further include a single, double-acting, hydraulic cylinder 34 operatively connected to work tool 14 to pivot work tool 14 vertically about a pivot axis 36. Boom member 22 may be pivotally connected to a frame 38 of work machine 10. Stick member 28 may pivotally connect boom member 22 to work tool 14 by way of pivot axis 30 and 36.

Each of hydraulic cylinders 26, 32, 34 may include a tube and a piston assembly (not shown) arranged to form two separated pressure chambers. The pressure chambers may be selectively supplied with pressurized fluid and drained of the pressurized fluid to cause the piston assembly to displace within the tube, thereby changing the effective length of hydraulic cylinders 26, 32, 34. The flow rate of fluid into and out of the pressure chambers may relate to a velocity of hydraulic cylinders 26, 32, 34, while a pressure differential between the two pressure chambers may relate to a force imparted by hydraulic cylinders 26, 32, 34 on the associated linkage members. The expansion and retraction of hydraulic cylinders 26, 32, 34 may assist in moving work tool 14.

Numerous different work tools 14 may be attachable to a single work machine 10 and controllable via operator station 20. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot relative to work machine 10, work tool 14 may alternatively or additionally rotate, slide, swing, lift, or move in any other manner known in the art.

Drive system 16 may include one or more traction devices to propel work machine 10. In one example, drive system 16 includes a left track 40L located on one side of work machine 10 and a right track 40R located on an opposing side of work machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices. In the example of FIG. 1, work machine 10 may be steered by generating a speed difference between left and right travel motors 42L, 42R, while straight travel may be facilitated by generating substantially equal output speeds from left and right travel motors 42L, 42R.

Each of left and right travel motors 42L, 42R may be driven by creating a fluid pressure differential. Specifically, each of left and right travel motors 42L, 42R may include first and second chambers (not shown) located to either side of an impeller (not shown). When the first chamber is filled with pressurized fluid and the second chamber is drained of fluid, the respective impeller may be urged to rotate in a first direction. Conversely, when the first chamber is drained of the fluid and the second chamber is filled with the pressurized fluid, the respective impeller may be urged to rotate in an opposite direction. The flow rate of fluid into and out of the first and second chambers may determine an output rotational velocity of left and right travel motors 42L, 42R, while a pressure differential between left and right travel motors 42L, 42R may determine an output torque.

Power source 18 may embody a combustion engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce mechanical and/or electrical power outputs that may then be converted to hydraulic power for moving hydraulic cylinders 26, 32, 34 and left and right travel motors 42L, 42R.

Operator station 20 may be configured to receive input from a work machine operator indicative of a desired work tool and/or work machine movement. Specifically, operator station 20 may include one or more operator interface devices 46 embodied as single or multi-axis joysticks located within proximity of an operator seat. Operator interface devices 46 may be proportional-type controllers movable between a neutral position and a maximum position to move and/or orient work tool 14 at a desired work tool velocity. Likewise, the same or another operator interface device 46 may be movable between a neutral position and a maximum position to move and/or orient work machine 10 relative to work surface 24 at a desired work machine velocity. As operator interface device 46 is moved between the neutral and maximum positions, a corresponding interface device position signal may be generated indicative of the location. It is contemplated that different operator interface devices may alternatively or additionally be included within operator station 20 such as, for example, wheels, knobs, push-pull devices, switches, pedals, and other operator interface devices known in the art.

Figure 2:
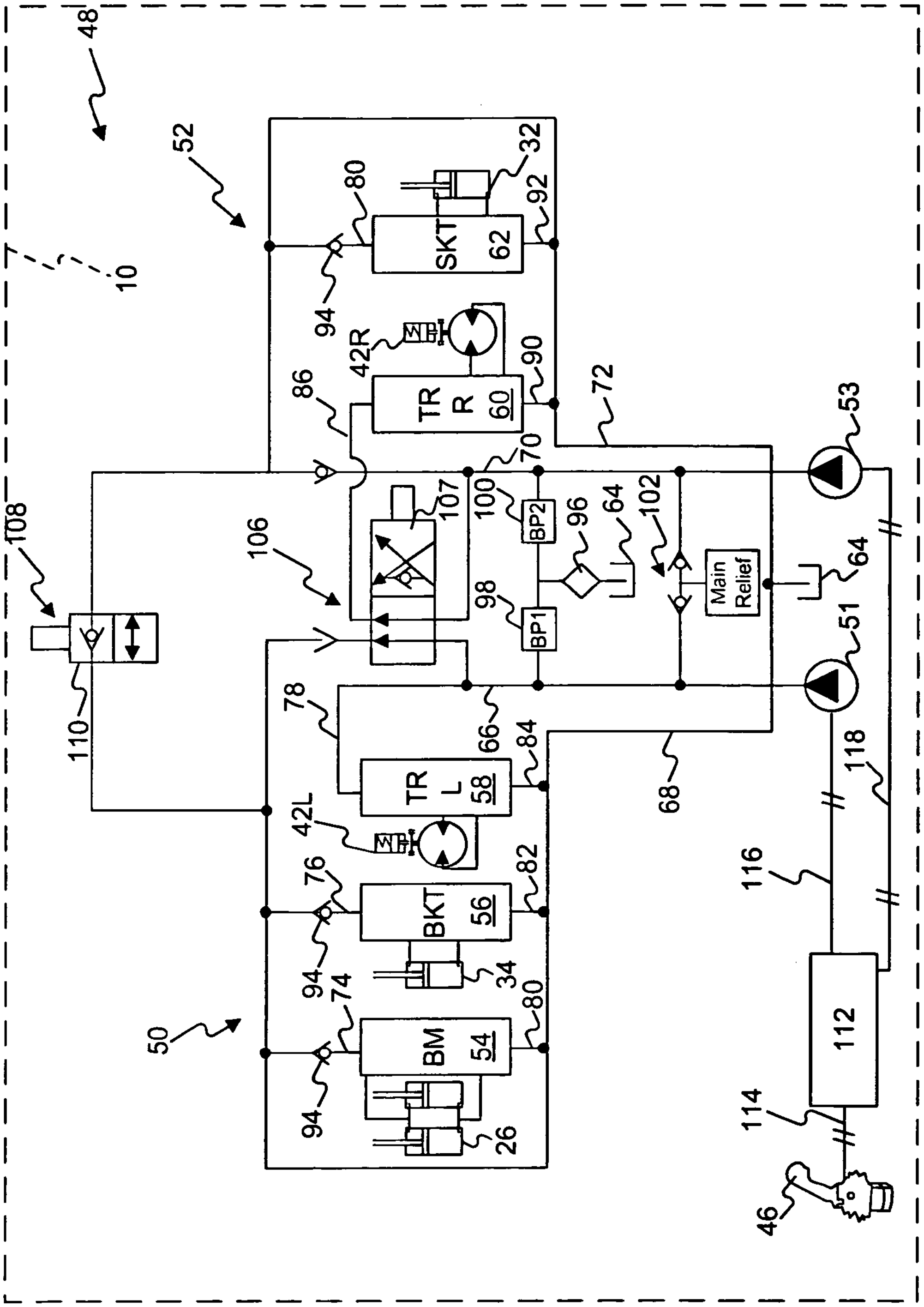
FIG. 2 is a schematic illustration of an exemplary disclosed hydraulic control system for the work machine of FIG. 1.

As illustrated in FIG. 2, work machine 10 may include a hydraulic control system 48 having a plurality of fluid components that cooperate to move work tool 14 (referring to FIG. 1) and work machine 10. In particular, hydraulic control system 48 may include a first circuit 50 configured to receive a first stream of pressurized fluid from a first source 51, and a second circuit 52 configured to receive a second stream of pressurized fluid from a second source 53. First circuit 50 may include a boom control valve 54, a bucket control valve 56, and a left travel control valve 58 connected in parallel to receive the first stream of pressurized fluid. Second circuit 52 may include a right travel control valve 60 and a stick control valve 62 connected in parallel to receive the second stream of pressurized fluid. It is contemplated that additional control valve mechanisms may be included within first and/or second circuits 50, 52 such as, for example, a swing control valve configured to control a swinging motion of implement system 12 relative to drive system 16, one or more attachment control valves, and other suitable control valve mechanisms.

First and second sources 51, 53 may be configured to draw fluid from one or more tanks 64 and pressurize the fluid to predetermined levels. Specifically, each of first and second sources 51, 53 may embody a pumping mechanism such as, for example, a variable displacement pump, a fixed displacement pump, or any other source known in the art. First and second sources 51, 53 may each be separately and drivably connected to power source 18 of work machine 10 by, for example, a countershaft (not shown), a belt (not shown), an electrical circuit (not shown), or in any other suitable manner. Alternatively, each of first and second sources 51, 53 may be indirectly connected to power source 18 via a torque converter, a reduction gear box, or in any other suitable manner. First source 51 may be configured to produce the first stream of pressurized fluid independent of the second stream of pressurized fluid produced by second source 53. The first and second streams may be pressurized to different pressure levels and may flow at differing rates.

Tank 64 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 64. It is contemplated that hydraulic control system 48 may be connected to multiple separate fluid tanks or to a single tank.

Each of boom, bucket, right travel, left travel, and stick control valves 54-62 may regulate the motion of their related fluid actuators. Specifically, boom control valve 54 may have elements movable to control the motion of hydraulic cylinders 26 associated with boom member 22, bucket control valve 56 may have elements movable to control the motion of hydraulic cylinder 34 associated with work tool 14, and stick control valve 62 may have elements movable to control the motion of hydraulic cylinder 32 associated with stick member 28. Likewise, left travel control valve 58 may have valve elements movable to control the motion of left travel motor 42L, while right travel control valve 60 may have elements movable to control the motion of right travel motor 42R.

The control valves of first and second circuits 50, 52 may be connected to allow pressurized fluid to flow to and drain from their respective actuators via common passageways. Specifically, the control valves of first circuit 50 may be connected to first source 51 by way of a first common supply passageway 66, and to tank 64 by way of a first common drain passageway 68. The control valves of second circuit 52 may be connected to second source 53 by way of a second common supply passageway 70, and to tank 64 by way of a second common drain passageway 72. Boom, bucket, and left travel control valves 54-58 may be connected in parallel to first common supply passageway 66 by way of individual fluid passageways 74, 76, and 78, respectively, and in parallel to first common drain passageway 68 by way of individual fluid passageways 80, 82, and 84, respectively. Similarly, right travel and stick control valves 60, 62 may be connected in parallel to second common supply passageway 70 by way of individual fluid passageways 86 and 88, respectively, and in parallel to second common drain passageway 72 by way of individual fluid passageways 90 and 92, respectively. A check valve element 94 may be disposed within each of fluid passageways 74, 76, 94 to provide for unidirectional supply of pressurized fluid to the control valves.

Because the elements of boom, bucket, right travel, left travel, and stick control valves 54-62 may be similar and function in a related manner, only the operation of boom control valve 54 will be discussed in this disclosure. In one example, boom control valve 54 may include a first chamber supply element (not shown), a first chamber drain element (not shown), a second chamber supply element (not shown), and a second chamber drain element (not shown). The first and second chamber supply elements may be connected in parallel with fluid passageway 74 to fill their respective chambers with fluid from first source 51, while the first and second chamber drain elements may be connected in parallel with fluid passageway 80 to drain the respective chambers of fluid. To extend hydraulic cylinders 26, the first chamber supply element may be moved to allow the pressurized fluid from first source 51 to fill the first chambers of hydraulic cylinders 26 with pressurized fluid via fluid passageway 74, while the second chamber drain element may be moved to drain fluid from the second chambers of hydraulic cylinders 26 to tank 64 via fluid passageway 80. To move hydraulic cylinders 26 in the opposite direction, the second chamber supply element may be moved to fill the second chambers of hydraulic cylinders 26 with pressurized fluid, while the first chamber drain element may be moved to drain fluid from the first chambers of hydraulic cylinders 26. It is contemplated that both the supply and drain functions may alternatively be performed by a single element associated with the first chamber and a single element associated with the second chamber.

The supply and drain elements may be solenoid movable against a spring bias in response to a command. In particular, hydraulic cylinders 26, 32, 34 and left and right travel motors 42L, 42R may move at a velocity that corresponds to the flow rate of fluid into and out of the first and second chambers. To achieve the operator-desired velocity indicated via the interface device position signal, a command based on an assumed or measured pressure may be sent to the solenoids (not shown) of the supply and drain elements that causes them to open against a spring bias an amount corresponding to the necessary flow rate. The command may be in the form of a flow rate command or a valve element position command.

The common supply and drain passageways 66-72 of first and second circuits 50, 52 may be interconnected for neutral flow and relief functions. In particular, first and second common supply passageways 66, 70 may bypass fluid to tank 64 by way of a common filter 96 and first and second bypass elements 98, 100, respectively. That is, first and second sources 51 and 53 may never destroke completely to zero output. First and second bypass elements 98, 100 may provide for a minimum amount of fluid flow to return to tank 64 while maintaining a minimum pump pressure, even when first and second sources 51, 52 are destroked to a minimum or "neutral" flow setting. In addition, first and second common drain passageways 68, 72 may relieve fluid from first and second circuits 50, 52 to tank 64 by way of a shuttle valve 102 and common main relief element 104. As fluid within first or second circuits 50, 52 exceeds a predetermined level, fluid from the circuit having the higher pressure may drain to tank 64 by way of shuttle valve 102 and common main relief element 104.

A straight travel valve 106 may selectively rearrange left and right travel control valves 58, 60 into a series relationship with each other. In particular, straight travel valve 106 may include a valve element 107 movable from a neutral position toward a straight travel position. When valve element 107 is in the neutral position, left and right travel control valves 58, 60 may be independently supplied with pressurized fluid from first and second sources 51, 53, respectively, to control left and right travel motors 42L, 42R separately. When valve element 107 is in the straight travel position, left and right travel control valves 58, 60 may be connected in series to receive pressurized fluid from only first source 51 for dependent movement. When only travel commands are active (e.g., no implement commands are active), valve element 107 may be in the neutral position. If loading of left and right travel motors 42L, 42R is unequal (i.e., left track 40L is on soft ground while right track 40R is on concrete), the separation of first and second sources 51, 53 via straight travel valve 106 may provide for straight travel, even with differing output pressures from first and second sources 51, 53. Straight travel valve 106 may be actuated to support implement control during travel of work machine 10. For example, if an operator actuates boom control valve 54 during travel, valve element 107 of straight travel valve 106 may move to supply left and right travel motors 42L, 42R with pressurized fluid from first source 51 while boom control valve may receive pressurized fluid from second source 53. Any excess fluid not used by boom control valve 54 may be supplied to left and right travel motors 42L, 42R via a check valve integral with straight travel valve 106.

When valve element 107 of straight travel valve 106 is moved to the straight travel position, fluid from second source 53 may be substantially simultaneously directed via valve element 107 through both first and second circuits 50, 52 to drive hydraulic cylinders 26, 32, 34. The second stream of pressurized fluid from second source 53 may be directed to hydraulic cylinders 26, 32, 34 of both first and second circuits 50, 52 because all of the first stream of pressurized fluid from first source 51 may be nearly completely consumed by left and right travel motors 42L, 42R during straight travel of work machine 10.

A combiner valve 108 may combine the first and second streams of pressurized fluids from first and second common supply passageways 66, 70 for high speed movement of one or more fluid actuators. In particular, combiner valve 108 may include a valve element 110 movable between a neutral position and a bidirectional flow-passing position. When in the neutral position, fluid from first circuit 50 may be allowed to flow into second circuit 52 in response to the pressure of first circuit 50 being greater than the pressure within second circuit 52 by a predetermined amount. The predetermined amount may be related to a spring bias and fixed during a manufacturing process. In this manner, when a right travel or stick function requires a rate of fluid flow greater than an output capacity of second source 53 and the pressure within second circuit 52 begins to drop, fluid from first source 51 may be diverted to second circuit 52 by way of valve element 110. When in the bidirectional flow-passing position, the second stream of pressurized fluid may be allowed to flow to first circuit 50 to combine with the first stream of pressurized fluid directed to control valves 54-58.

Hydraulic control system 48 may also include a controller 112 in communication with operator interface device 46 and with first and second sources 51, 53. Specifically, controller 112 may be in communication with operator interface device 46 by way of a communication line 114 and with first and second sources 51, 53 via communication lines 116 and 118, respectively. It is contemplated that controller 112 may be in communication with other components of hydraulic control system 48 such as, for example, combiner valve 108, control valves 54-62, common main relief element 104, first and second bypass elements 98, 100, straight travel valve 106, and other such components of hydraulic control system 48.

Controller 112 may embody a single microprocessor or multiple microprocessors that include a means for controlling an operation of hydraulic control system 48. Numerous commercially available microprocessors can be configured to perform the functions of controller 112. It should be appreciated that controller 112 could readily be embodied in a general work machine microprocessor capable of controlling numerous work machine functions. Controller 112 may include a memory, a secondary storage device, a processor, and any other components for running an application. Various other circuits may be associated with controller 112 such as power supply circuitry, signal conditioning circuitry, solenoid driver circuitry, and other types of circuitry.

One or more maps relating the interface device position signal, desired velocity, associated flow rates, and/or valve element position, for hydraulic cylinders 26, 32, 34 and left and right travel motors 42L, 42R may be stored in the memory of controller 112. Each of these maps may include a collection of data in the form of tables, graphs, and/or equations. In one example, desired velocity and commanded flow rate may form the coordinate axis of a 2-D table for control of the first and second chamber supply elements. The commanded flow rate required to move the fluid actuators at the desired velocity and valve element position of the appropriate supply element may be related in another separate 2-D map or together with desired velocity in a single 3-D map. It is also contemplated that desired velocity may be directly related to the valve element position in a single 2-D map. Controller 112 may be configured to allow the operator to directly modify these maps and/or to select specific maps from available relationship maps stored in the memory of controller 112 to affect fluid actuator motion. It is contemplated that the maps may also be selectable based on modes of work machine operation.

Controller 112 may be configured to receive input from operator interface device 46 and to command operation of control valves 54-62 in response to the input and the relationship maps described above. Specifically, controller 112 may receive the interface device position signal indicative of a desired velocity and reference the selected and/or modified relationship maps stored in the memory of controller 112 to determine flow rate values and/or associated positions for each of the supply and drain elements within control valves 54-62. The flow rates or positions may then be commanded of the appropriate supply and drain elements to cause filling of the first or second chambers at a rate that results in the desired work tool or work machine velocity.

Controller 112 may be configured to affect operation of combiner valve 108 in response to the determined flow rates. That is, if the determined flow rates associated with the desired velocities of particular fluid actuators meet predetermined criteria, controller 112 may cause valve element 110 to move toward the bidirectional flow-passing position to supply additional pressurized fluid to first circuit 50 or, conversely, may prevent valve element 110 from moving.

Figure 3:
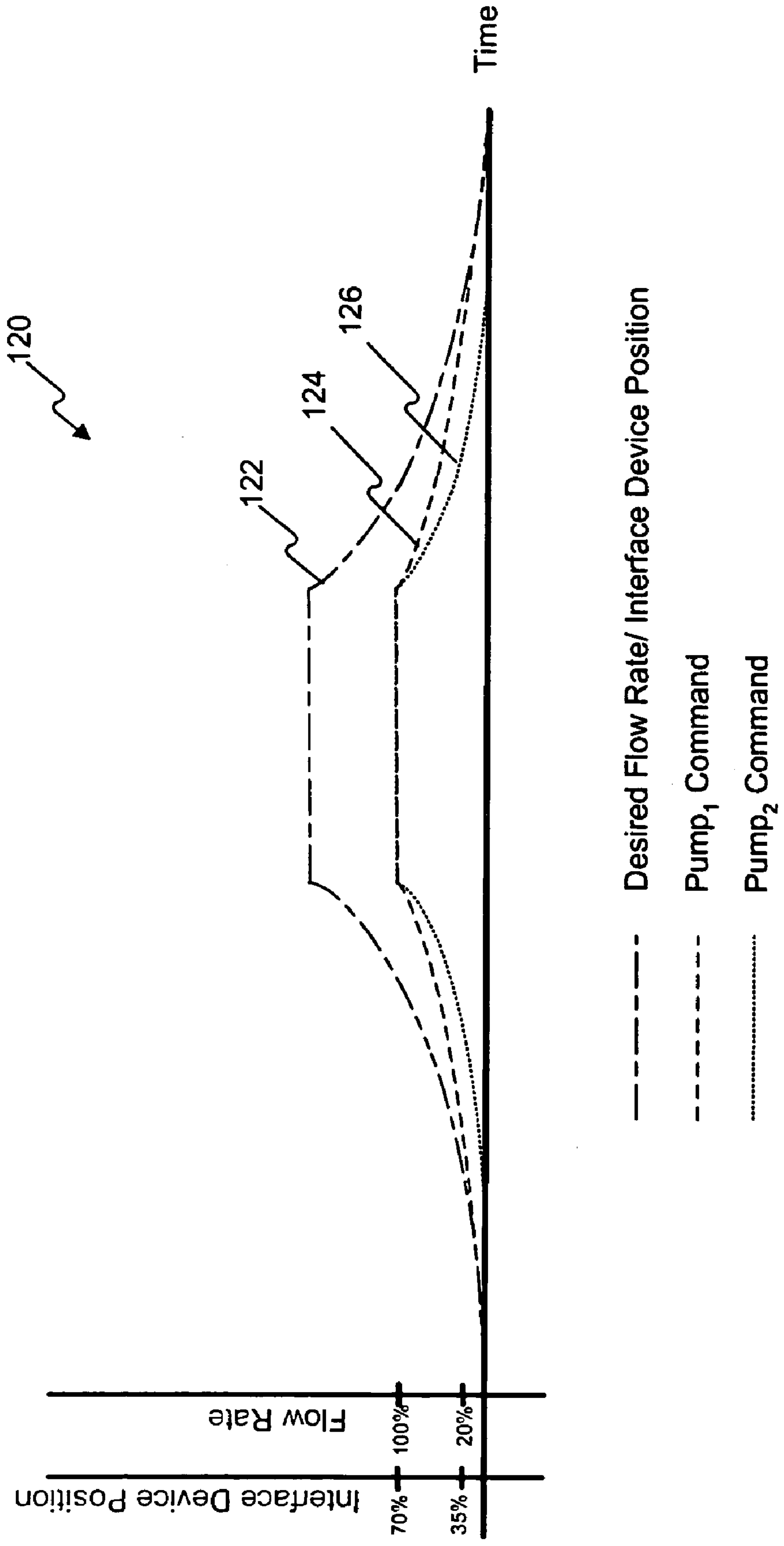
FIG. 3 is a graph illustrating an exemplary disclosed relationship associated with the control system of FIG. 2.

FIG. 3 illustrates a graph 120 containing a relationship between a flow rate of pressurized fluid or interface device position and output flow commands issued by controller 112 to first and second sources 51, 53. Specifically, a first curve 122 may represent the flow rate of pressurized fluid determined for and/or commanded of either boom control valve 54 or stick control valve 62, or alternatively the position of interface device 46 between the neutral and maximum positions. A second curve 124 may represent an output flow commanded of first source 51, if curve 122 is associated with boom control valve 54, or second source 53, if curve 122 is associated with stick control valve 62. A third curve 126 may represent the flow rate commanded of the other of first and second sources 51, 53. Although graph 120 may be specifically associated with boom and stick control valves 54 and 62, graph 120 may be similarly associated with any one of control valves 54-62.

As illustrated in FIG. 3, controller 112 may be configured to regulate the rate of fluid flow from sources 51, 53 in a number of different ways. In particular, controller 112 may determine when to operate one or both of sources 51, 53, and to what extent by comparing the determined flow rates associated with the desired velocities of fluid actuators 26, 32, 34, 42L, 42R to a set of predetermined values or alternatively by directly comparing the operator interface device position to a set of predetermined values. When comparing determined flow rates, the set of predetermined values may include a zero flow rate, a maximum flow rate, and a threshold flow rate. The threshold flow rate may be about 20% of the maximum flow rate available from a single source. When comparing the operator interface device position signal, the set of predetermined values may correspond with the neutral position, the maximum position, a first threshold position, and a second threshold position. The first threshold position may be 30% of the range from the neutral position to the maximum position, while the second threshold position may be 70% of the range. Controller 112 may regulate the output flow from first and second sources 51, 53 in response to the comparisons described above. It should be noted that the threshold positions described above are exemplary only and may be tuned to accommodate different applications.

INDUSTRIAL APPLICABILITY

The disclosed hydraulic control system may be applicable to any work machine that includes at least one fluid actuator and multiple sources of pressurized fluid where seamless cooperation between the multiple sources is desired. The disclosed hydraulic control system may smooth the operational transitions between the multiple sources and, thereby, reduce the fluctuation of loads placed on the power source that drives the multiple sources. The operation of hydraulic control system 48 will now be explained.

During operation of work machine 10, a work machine operator may manipulate operator interface device 46 to cause a movement of work tool 14 and/or work machine 10. The actuation position of operator interface device 46 between the neutral and maximum positions may be related to an operator-expected or desired velocity of work tool 14 and/or work machine 10. Operator interface device 46 may generate an interface device position signal indicative of the operator-expected or desired velocity during manipulation and send this signal to controller 112.

Controller 112 may receive input during operation of hydraulic cylinders 26, 32, and 34 and left and right travel motors 42L, 42R, and make determinations based on the input. Specifically, controller 112 may receive the operator interface device position signal, determine desired velocities for each fluid actuator within hydraulic control system 48, and determine the corresponding flow rate commands directed to control valves 54-62. From the interface device position signal, controller 112 may also determine whether or not straight travel of work machine 10 is desired and control operation of straight travel valve 106 and combiner valve 108 accordingly.

To provide the flow rate of fluid commanded to each of control valves 54-62, controller 112 may regulate the output of first and second sources 51, 53. Referring to FIG. 3, if an operator interface device 46 associated with one of the fluid actuators within first circuit 50 is moved away from the neutral position or if the flow rate determined for and/or commanded of one of the control valves within first circuit 50 is greater than zero (curve 122), operation of first source 51 may be initiated to produce the first stream of pressurized fluid (curve 124). As the position of this particular operator interface device 46 moves further toward the maximum position or the determined flow rate increases, controller 112 may affect the operation of first source 51 to increase the output of first source 51. In addition, as this particular operator interface device 46 moves past the first threshold position (35% interface device position range) or the determined flow rate exceeds the threshold flow rate (20% first source capacity), controller 112 may initiate operation of second source 53 in anticipation of flow sharing between first and second circuits 50, 52 (curve 126). As this particular operator interface device 46 reaches the second threshold position (70% interface device position range) or the determined flow rate reaches the combined maximum flow capacity of first and second sources 51, 53, both first and second sources 51, 53 may be controlled to substantially simultaneously output pressurized fluid at their maximum output capacities. Control of first and second sources 51, 53 may be similar when an operator interface device 46 associated with second circuit 52 is actuated, but with operation of second source 53 being initiated before operation of first source 51.

Several advantages over the prior art may be associated with the control strategy and hardware of hydraulic control system 48. Specifically, because the operation of both first and second sources 51, 53 may be controlled based on the position of operator interface device 46 or determined flow rates rather than multiple separate resolver valves, hydraulic control system 48 may be simple, inexpensive, and reliable. In addition, because hydraulic control system 48 controls the operation of first and second sources 51, 53 in anticipation of a required flow or pressure rather than in reaction to a fluid fluctuation, the operational transition between the two sources may be smooth and nearly seamless. This smooth and nearly seamless operation may facilitate the reduction of speed deviations experienced by power source 18, thereby improving the efficiency of work machine 10. In addition, because hydraulic system 48 may anticipate rather than react, it may respond quickly to changing needs within the system.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:

a first pump configured to pressurize a fluid;

a second pump configured to pressurize the fluid;

an operator control device movable through a range of motion from a neutral position to a maximum position to generate a corresponding control signal; and a controller in communication with the first pump, the second pump, and the operator control device, the controller configured to:

receive the control signal;

affect operation of the first pump in response to the control signal as the operator control device is moved throughout the range of motion; and affect operation of the second pump in response to the control signal only as the operator control device is moved through a portion of the range of motion, wherein as the operator control device is moved to a point at a beginning of the portion of the range of motion, the controller affects operation of the second pump, such that both the first pump and the second pump pressurize fluid simultaneously at a level below full output capacities of each of the first pump and the second pump.

2. The hydraulic control system of claim 1, wherein:

the controller is configured to initiate operation of the first pump in response to the control signal as the operator control device is moved away from the neutral position; and the controller is configured to initiate operation of the second pump in response to the control signal only as the operator control device is moved a predetermined amount away from the neutral position.

3. The hydraulic control system of claim 2, wherein the predetermined amount is about 35% of the range of motion.

4. The hydraulic control system of claim 2, wherein the controller is configured to substantially simultaneously bring operation of the first and second pumps to their full output capacities in response to the control signal when the operator control device is moved a second predetermined amount away from its neutral position.

5. The hydraulic control system of claim 4, wherein the second predetermined amount is about 70% of the range of motion.

6. The hydraulic control system of claim 4, wherein:

the operator control device is a first operator control device;

the hydraulic control system includes a second operator control device movable through a range of motion from a neutral position to a maximum position to generate a corresponding second control signal; and the controller is further configured to:

initiate operation of the second pump in response to the second control signal as the second operator control device is moved away from its neutral position; and initiate operation of the first pump in response to the second control signal only as the second operator control device is moved a predetermined amount away from its neutral position.

7. A hydraulic control system including:

a first pump configured to pressurize a fluid;

a second pump configured to pressurize the fluid;

a fluid actuator movable by the pressurized fluid; and a controller in fluid communication with the first pump and the second pump, wherein the controller is configured to:

determine a desired characteristic for the fluid actuator;

initiate operation of the first pump as the desired characteristic exceeds a minimum value; and initiate operation of the second pump only as the desired characteristic exceeds the minimum value by a predetermined amount, wherein when the desired characteristic exceeds the minimum value by the predetermined amount, both the first pump and the second pump pressurize fluid simultaneously at level below full output capacities of each of the first pump and the second pump.

8. The hydraulic control system of claim 7, wherein the desired characteristic is a velocity of the fluid actuator.

9. The hydraulic control system of claim 7, wherein the desired characteristic is a desired percentage of available hydraulic power from the first pump supplied to the fluid actuator.

10. The hydraulic control system of claim 7, wherein the desired characteristic is a desired flow rate of the pressurized fluid supplied to the fluid actuator.

11. The hydraulic control system of claim 10 wherein:

the first pump has a maximum flow capacity; and the predetermined amount is a desired flow rate of about 20% of the maximum flow capacity.

12. The hydraulic control system of claim 11, wherein the controller is configured to substantially simultaneously bring operation of the first and second pumps to their maximum flow capacities in response to the desired characteristic.

13. The hydraulic control system of claim 12, wherein:

the fluid actuator is a first fluid actuator, the hydraulic control system includes a second fluid actuator movable by the pressurized fluid; and the controller is further configured to:

determine a second desired characteristic for the second fluid actuator;

initiate operation of the second pump as the second desired characteristic exceeds the minimum value; and initiate operation of the first pump only as the second desired characteristic exceeds the minimum value by the predetermined amount.

14. A method of operating a hydraulic system, comprising:

receiving a control signal indicative of the position of an operator control device within a range of motion from a neutral position to a maximum position;

affecting operation of a first pump in response to the control signal when the control signal indicates an operator control device position away from the neutral position; and affecting operation of a second pump in response to the control signal only when the control signal indicates an operator control device position a predetermined amount away from the neutral position, such that both the first pump and the second pump pressurize fluid simultaneously at a level below full output capacities of each of the first pump and the second pump.

15. The method of claim 14, wherein the predetermined amount is about 35% of the range of motion.

16. The method of claim 14, further including bringing operation of the first and second pumps to their full output capacities in response to the control signal when the operator control device is moved a second predetermined amount away from its neutral position.

17. The method of claim 16, wherein the second predetermined amount is about 70% of the range of motion.

18. The method of claim 14, further including:

receiving a second control signal indicative of the position of a second operator control device within the range of motion from a neutral position to a maximum position;

affecting operation of the second pump in response to the second control signal when the second control signal indicates a position of the second operator control device being away from the neutral position; and affecting operation of the first pump in response to the second control signal only when the second control signal indicates a position the second operator control device being away from the neutral position by a predetermined amount.

19. A method of operating a hydraulic control system, comprising:

determining a desired characteristic for a fluid actuator;

initiating operation of a first pump as the desired characteristic exceeds a minimum value; and initiating operation of a second pump only as the desired characteristic exceeds the minimum value by a predetermined amount, such that both the first pump and the second pump pressurize fluid simultaneously at a level below full output capacities of each of the first pump and the second pump.

20. The method of claim 19, wherein the desired characteristic is a velocity of the fluid actuator.

21. The method of claim 19, wherein the desired characteristic is a desired flow rate of the pressurized fluid supplied to the fluid actuator.

22. The method of claim 21, wherein:

the first pump has a maximum flow capacity; and the predetermined amount is a desired flow rate of about 20% of the maximum flow capacity.

23. The method of claim 22, further including substantially simultaneously bringing operation of the first and second pumps to their maximum flow capacities.

24. The method of claim 19, further including:

determining a second desired characteristic for a second fluid actuator;

initiating operation of the second pump as the second desired characteristic exceeds the minimum value; and initiating operation of the first pump only as the second desired characteristic exceeds the minimum value by a predetermined amount.

25. A machine, comprising:

a power source configured to produce a power output;

a first pump drivingly coupled to the power source to pressurize a fluid;

a second pump drivingly coupled to the power source to pressurize the fluid;

a work tool;

a first fluid actuator operably coupled to the work tool, configured to receive the pressurized fluid, and configured to move the work tool;

a first operator control device movable to control motion of the first fluid actuator;

a second fluid actuator operably coupled to the work tool, configured to receive the pressurized fluid, and configured to move the work tool;

a second operator control device configured to control motion of the second fluid actuator; and a controller in communication with the first and second pumps and the first and second operator control devices, the controller configured to:

receive a first input indicative of a desired motion of the first fluid actuator;

initiate operation of the first pump in response to the first input exceeding a minimum value;

initiate operation of the second pump in response to the first input exceeding the minimum value by a first predetermined amount; and bring operation of the first and second pumps substantially simultaneously to their maximum output flow capacities in response to the first input exceeding the minimum value by a second predetermined amount.

26. The machine of claim 25, wherein:

the first input is a position of the first operator control device;

the first predetermined amount is about 35% of the way from a neutral position to a maximum position; and the second predetermined amount is about 70% of the way from a neutral position to a maximum position.

27. The machine of claim 25, wherein the input is a desired velocity of the first fluid actuator.

28. The machine of claim 25, wherein:

the first input is a desired flow rate of the pressurized fluid into the first fluid actuator; and the predetermined amount is about 20% of the maximum flow capacity of the first pump.

29. The machine of claim 25, wherein the controller is further configured to:

receive a second input indicative of a desired motion of the second fluid actuator;

initiate operation of the second pump in response to the second input exceeding the minimum value; and initiate operation of the first pump in response to the second input exceeding the minimum value by the predetermined amount.

* * * * *